J. L. CREVELING.
ELECTRIC REGULATION.
APPLICATION FILED SEPT. 27, 1911.
1,216,083.
Patented Feb. 13, 1917.
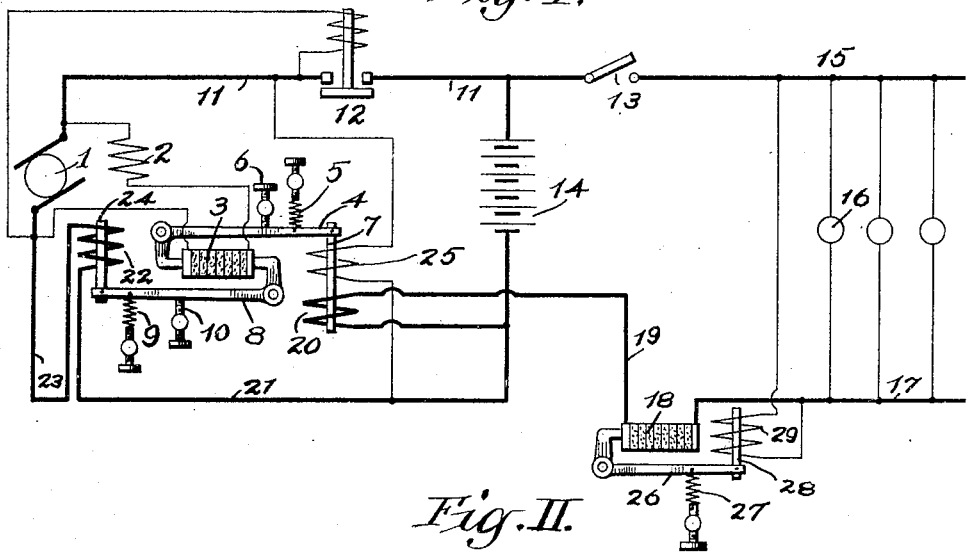
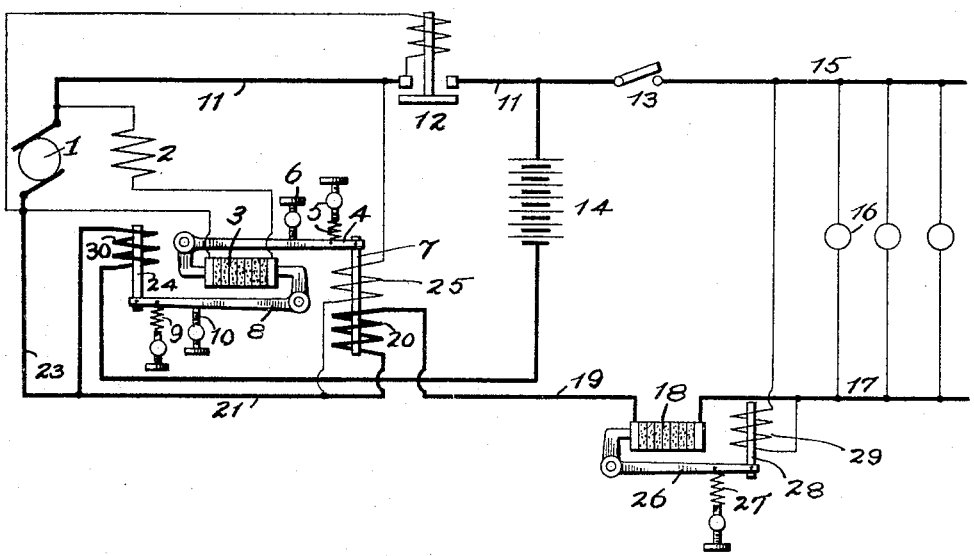
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,216,083. Specification of Letters Patent. Patented Feb. 13, 1917.

Application filed September 27, 1911. Serial No. 651,494.

*To all whom it may concern:*

Be it known that I, JOHN L. CREVELING, a resident of New York, in the county of New York and State of New York, have invented certain new and useful Improvements in Electric Regulation, as set forth in the annexed specification and drawing, forming a part thereof.

My invention pertains to that class of electric regulation wherein it is desired to regulate a dynamo or generator in a predetermined manner and has for its particular object to provide means for automatically thus regulating a dynamo.

As my invention is particularly applicable to systems of electric distribution wherein a dynamo is used to charge a storage battery and furnish current to lamps or other translating devices, it will be described in connection with such a system.

In the drawing, Figure I is a diagrammatic representation of one type of system embodying my invention.

Fig. II shows another form of the system shown in Fig. I embodying my invention.

In Fig. I, 1 represents a dynamo or generator provided with the usual field coil 2, having in series therewith the variable resistance 3, in this instance indicated as of the carbon pile variety. 4 is a lever normally drawn in an upward direction by the adjustable spring 5, in such manner as to tend to compress the carbon pile 3 and lower the resistance thereof. 6 is an adjustable stop limiting the upward movement that may be given to the lever 4 by the spring 5. The lever 4 is provided at one extremity with a core of magnetic material 7 and thus motion imparted to the core 7 may be made to regulate the generator. 8 is a lever normally drawn in a downward direction as by the adjustable spring 9 and the limit of motion that may be given to the lever 8 in this direction is determined by the stop 10. The lever 8 is provided at one extremity with a core of magnetic material 24 and thus motion imparted to the core 24 may regulate the generator. 11 represents the positive lead of the generator which is carried to one side of the switch 12, which is preferably of the automatic variety adapted to close the circuit when the voltage of the generator is substantially that of the battery and as many such switches are known in the art and the particular type of switch forms no part of my present invention the presence of one of the well known types is merely indicated diagrammatically. From the opposite terminal of the switch 12, the lead 11 is carried to one side of the translation circuit switch 13 and is connected with the positive side of the storage battery 14. From the switch 13 the main 15 is carried to the positive side of the translating devices 16, having their negative terminals in connection with the wire 17, which is led to one terminal of the translation circuit regulator, in this instance indicated as a carbon pile 18, having its remaining terminal connected with the wire 19 in communication with one end of the solenoid 20, the opposite end of which is carried to the wire 21 in communication with the negative side of the storage battery 14 and one end of the solenoid 22, the opposite end of which is connected as by lead 23 to the negative side of the generator 1. 25 is a fine winding in shunt across the generator or battery circuit and surrounding the core 7 in such manner as to tend to draw the same in a downward direction. 26 is a lever normally drawn in a downward direction as by adjustable spring 27 in such manner as to tend to reduce the resistance 18. The lever 26 is provided at one extremity with a core of magnetic material 28 surrounded by a solenoid 29 in shunt across the translation circuit.

In the form of my invention shown in Fig. II like numerals have been used to indicate like parts, and the only difference brought out in this modification is that the coil 22 in the main circuit is suppressed and the coil 30 in the battery circuit employed in its stead.

An operation of my invention is substantially as follows, referring particularly to Fig. I.

If the generator be running and its voltage be sufficient to charge the storage battery, switch 12 will be closed and current will flow from the generator 1, through lead 11, switch 12, battery 14, wire 21, coil 22 and lead 23 to the generator, and I so adjust the spring 9 that when the maximum desired current is delivered to the battery by the generator any appreciable increase above this current in the coil 22 will cause the core 24 to be drawn upwardly against the action of spring 9 and increase the resistance 3 in such manner as to prevent this maximum current from being exceeded. If now the battery has been charged at this maximum current until its voltage has risen until the maximum voltage desired to have impressed across the battery circuit is reached, I so adjust the spring 5 that any appreciable increase above this desired maximum voltage will be prevented by the coil 25 depressing the core 7 against the action of spring 5 and increasing the resistance 3, and if the voltage of the battery now rise further, the current supplied thereto will taper off as the battery voltage rises. This maximum voltage desired to have across the battery and generator circuit when the battery is alone charging is quite in excess of the voltage of the battery when the same is furnishing current to the translation circuit and, therefore, quite in excess of the desired translation circuit voltage which is necessarily held substantially constant, and if now the battery is charging at its maximum voltage and the translation devices be thrown on by closing the switch 13, current will flow through lead 11, switch 13, wire 15, translating devices 16, wire 17, resistance 18, wire 19 and solenoid 20 and I so adjust the spring 27 that current in the coil 29 will raise the core 28 and increase the resistance 18 in such manner as to produce the normal desired voltage across the translation circuit and thus control the current in the translation circuit and in the coil 20. The coil 20 is so wound as to assist the coil 25 and, therefore, require a lower voltage across the generator and battery circuit to be held constant by the coil 25 through manipulation of resistance 3. Thus the standard of the voltage for which the generator will be regulated will depend upon the current in the translation circuit, which in turn is affected by the operation of the translation circuit voltage regulator. That is, if there be little or no load upon the translation circuit the generator will be regulated in such manner that it cannot exceed the maximum desired charging voltage across the battery and if a load be placed upon the translation circuit the voltage standard of regulation will be lowered so that the generator cannot exceed a voltage somewhat below that possible when the battery alone is charging and, therefore, the difference between the voltages maintained across the generator circuit and the translation circuit will be less than if the voltage regulation were not thus modified with the consequent result of economy, and it will be noted that the translation circuit regulator by affecting the current in the adjusting coil 20 will affect the voltage regulating means for operating the generator regulating resistance 3.

The operation of the system shown in Fig. II may readily be understood from the above description of the system of Fig. I, it being only necessary to remember that the battery charging current only flows through the solenoid 30 and, therefore, effects the current regulation of the generator as distinguished from the total current circulating in coil 22 in Fig. I.

I do not wish in any way to limit myself to the exact system set forth in this application merely to illustrate one type of system comprehending the essentials of my invention, for it will be obvious that wide departure may be made without departing from the spirit and scope of my invention which is as set forth in the following claims:

1. The combination with a generator, a main circuit, and a translation circuit, of a regulator for the generator comprising a resistance medium in the field thereof; means for operating the regulator responsive to current fluctuations and comprising a pivotally mounted lever in coöperation with said medium; means for operating the regulator responsive to voltage fluctuations comprising an independent pivotally mounted lever coöperating with said medium; and means for modifying the voltage regulation of the generator affected by current in the translation circuit.

2. The combination with a generator, a main circuit, and a translation circuit, of a regulator for the generator comprising a resistance medium; means for operating the regulator responsive to current fluctuations and including a lever operating upon one end of said medium; means for operating the regulator responsive to voltage fluctuations and including a lever upon the opposite end of said medium; and means for modifying the voltage regulation of the generator affected by current in the translation circuit.

3. The combination with a generator, a main circuit, and a translation circuit, of a regulator for the generator comprising a compressible resistance medium; means for varying the resistance of said medium responsive to current fluctuations and including a lever coöperating with one end thereof; means for varying the resistance of said medium responsive to voltage fluctuations and including a lever coöperating with the opposite end of said medium; and means for modifying the voltage regulation of the generator affected by current in the translation circuit.

4. The combination with a generator, a main circuit, and a translation circuit, of a regulator for the generator comprising a resistance medium in the field thereof; means for operating the regulator responsive to current fluctuations and comprising a pivotally mounted lever in coöperation with said medium; means for operating the regulator responsive to voltage fluctuations comprising an independent pivotally mounted lever coöperating with said medium; and means responsive to voltage fluctuations across the translation circuit for affecting the current in said circuit and thereby affecting the voltage responsive means.

5. The combination with a generator, a main circuit, and a translation circuit, of a regulator for the generator comprising a resistance medium in the field thereof; means for operating the regulator responsive to current fluctuations and comprising a pivotally mounted lever in coöperation with said medium; means for operating the regulator responsive to voltage fluctuations comprising an independent pivotally mounted lever coöperating with said medium; a resistance medium in the translation circuit coöperating with the voltage responsive means; and voltage operated means for controlling said translation circuit resistance medium.

6. The combination with a generator, a main circuit and a translation circuit, of a means for regulating the generator, means for operating the same responsive to current fluctuations, and means for operating the regulating means responsive to voltage fluctuations, comprising a coil in shunt to the main circuit and a coil in series with the translation circuit, said coils acting to assist each other when the generator is supplying current to the translation circuit.

JOHN L. CREVELING.

Witnesses:
ANNA M. WALL,
M. HERSKOVITZ.